P. STOLTE.
WALL WITH METALLIC LATHING.
APPLICATION FILED AUG. 30, 1910.
1,004,100.
Patented Sept. 26, 1911.
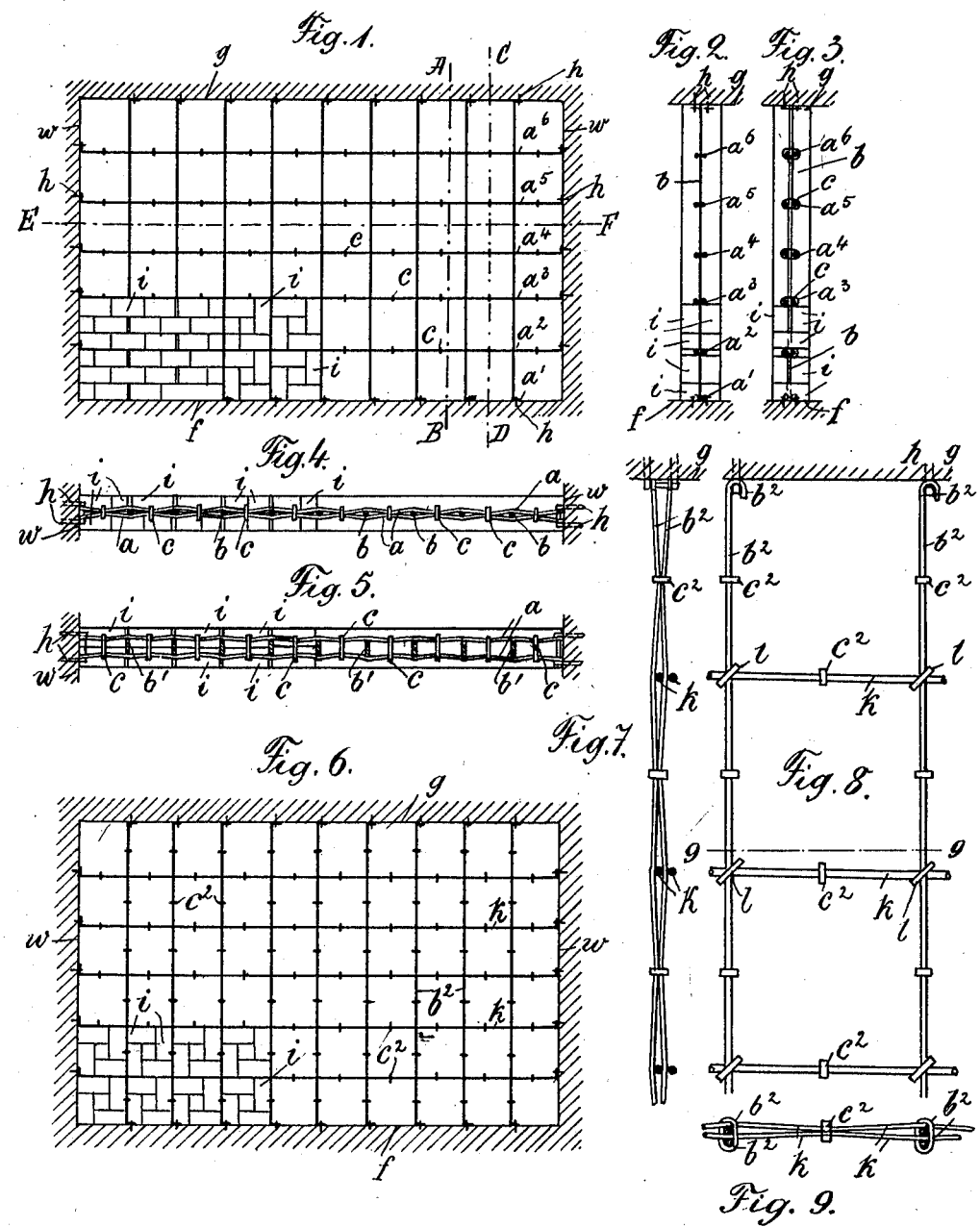

UNITED STATES PATENT OFFICE.

PAUL STOLTE, OF CHARLOTTENBURG, GERMANY, ASSIGNOR OF ONE-HALF TO SIGMUND KATZENSTEIN, OF CHARLOTTENBURG, GERMANY.

WALL WITH METALLIC LATHING.

1,004,100.  Specification of Letters Patent.  Patented Sept. 26, 1911.

Application filed August 30, 1910. Serial No. 579,629.

*To all whom it may concern:*

Be it known that I, PAUL STOLTE, a citizen of the Empire of Germany, residing at Charlottenburg, in the Empire of Germany, have invented a new and useful Wall with Metallic Lathing, of which the following is a specification.

My invention relates to improvements in walls with embedded crossing iron rods or bars, whereby the construction of the lathing and of the wall is facilitated.

The chief improvement consists in making the lathing from a series of parallel rods or bars and a series of binding rods placed in pairs at right angles to and on both sides of the rods or bars of the first series.

Another improvement consists in connecting together the two components of each pair of binding bars in the second series in the middle between any two of the rods or bars of the first series by means of metallic loops or binders, so that they are thereby pressed against the rods or bars of the first series. The ends of the bars in both series may be embedded in existing walls, a floor and a ceiling, or they may be hooked in metallic clamps or the like introduced into or embedded in the walls, floor and ceiling. The wall can be so constructed from brickwork in any known manner, as to inclose the lathing. Where so preferred, also the rods or bars in the first series may be disposed in pairs and on both sides of one of the two components in each pair of binding rods in the second series, against which they are pressed by connecting them together in the middle between any two of the pairs of binding bars in the second series by means of metallic loops or binders.

I will now proceed to describe my invention with reference to the accompanying drawing, in which—

Figure 1 is a diagrammatic elevation of a metallic lathing and a piece of the wall formed from brickwork filling up a few fields of the lathing, Fig. 2 is a vertical cross section through the finished wall and lathing on the line A—B in Fig. 1, Fig. 3 is a vertical cross section through the same on the line C—D in Fig. 1, Fig. 4 is a horizontal section through the same on the line E—F in Fig. 1, Fig. 5 is a similar horizontal section through a modification of the metallic lathing, the vertical round rods being replaced by flat bars, Fig. 6 is a diagrammatic elevation of a modified metallic lathing and a piece of the wall filling up a few fields of the lathing, Fig. 7, is a vertical cross section on an enlarged scale through the same, the wall being indicated by dotted lines, Fig. 8 is an elevation of the same, and Fig. 9 is a horizontal section through the same.

Similar letters of reference refer to similar parts throughout the several views.

As is shown at Figs. 1, 2, 3 and 4, the new lathing may be made from a first series of vertical round rods $b$ $b$ disposed at like distances from one another, and a second series of horizontal binding round rods $a$ $a$ placed in pairs and on both sides of the rods $b$ $b$ of the first series, the pairs of the binding rods $a$ $a$ being disposed at like distances from one another. In Fig. 1 the distance between any two rods $b$ $b$ of the first series is shown to be like the distance between any two pairs of binding rods $a$ $a$ of the second series. The binding rods $a$ $a$ of each pair are connected together by metallic loops or binders $c$ $c$ of any known construction disposed in the middle between any two of the rods $b$ $b$, so that the binding rods $a$ $a$ are slightly bent and strongly pressed against the rods $b$ $b$. In Fig. 1 the ends of the rods in both series are shown to be rectangularly bent and attached to the existing walls $w$ $w$, the floor $f$ and the ceiling $g$ by means of metallic clamps $h$ $h$ or the like. The rods $b$ $b$ of the first series may also have any other cross section, for example they may be flat bars $b'$ $b'$ of rectangular cross section, as is shown in Fig. 5.

The metallic lathing described with reference to Figs. 1, 2, 3 and 4 may be first constructed and finished, before the wall $i$ is erected in brickwork, so as to inclose the lathing, as is clearly shown in Fig. 1. Or the metallic lathing may be constructed at the same time as the wall. In this case, first the clamps $h$ $h$ may be introduced or fastened in the floor $f$, the walls $w$ $w$, and the ceiling $g$, then the vertical rods or bars $b'$ $b'$ are hooked into the clamps $h$ $h$ below and above, next the lowermost horizontal rods $a'$ $a'$ and the next higher rods $a^2$ $a^2$ are hooked with their ends into the corresponding clamps $h$ $h$ in the walls and are connected together in the middle between any two of the vertical rods $b$ $b$ or $b'$ $b'$ by means of metallic loops or binders $c$ $c$. At last the wall $i$ up to the next higher horizontal rods $a^2$ $a^2$ is built up from brickwork. Thereupon the next following horizontal rods $a^3$ $a^3$ are hooked into the corresponding clamps $h$ $h$ and are connected together between any two of the vertical rods $b$ $b$ or bars $b'$ $b'$ by metallic loops or binders, after which the brickwork is continued up to the higher horizontal rods $a^3$ $a^3$. In this manner the work may be continued until the wall is finished.

Where so preferred, the rods of the first series may be placed horizontally and those of the second series vertically. Hitherto rods or bars of the first series, that is $b$ $b$ in Figs. 1 to 4 and $b'$ $b'$ in Fig. 5, were assumed to be single. Where so preferred, they may be disposed in pairs, the same as the rods in the second series. This is for example illustrated in Figs. 6 to 9, where horizontal rods $k$ $k$ are disposed in pairs and on both sides of one rod $b^2$ in each pair of vertical rods. Otherwise the construction is similar to that of the other lathing described above, and the same letters of reference provided with the index 2 are employed. Where so preferred, the horizontal and vertical rods may also be connected together at their crossing points by means of loops or binders $l$ $l$ of any known construction.

I claim:

1. A metallic lathing to be embedded in a wall, comprising parallel bars placed in one direction, parallel binding bars placed in pairs at right angles to said first mentioned bars and on both sides of same, and binders connecting the binding bars of each pair together in the middle between any two of said first mentioned bars, said binders holding said binding bars in pressing engagement with said first mentioned bars.

2. A metallic lathing to be embedded in a wall, comprising parallel bars placed in one direction, parallel binding bars placed in pairs at right angles to said first mentioned bars and on both sides of same, binders connecting the binding bars of each pair together in the middle between any two of said first mentioned bars, said binders holding said binding bars in pressing engagement with said first mentioned bars, and binders connecting the binding bars at the crossing points with said first mentioned bars.

3. A metallic lathing to be embedded in a wall, comprising parallel bars placed in pairs in one direction, parallel binding bars placed in pairs at right angles to said first mentioned bars, said binding bars being positioned on opposite sides of one of said first mentioned bars in each pair, binders connecting together the binding bars of each pair in the middle between any two of said first mentioned pairs of bars, said binders holding said binding bars in pressing engagement with said first mentioned bars, and binders connecting together the bars of each of said first mentioned pairs of bars in the middle between any two of the pairs of binding bars.

4. A metallic lathing to be embedded in a wall, comprising parallel bars placed in pairs in one direction, parallel binding bars placed in pairs at right angles to said first mentioned bars, said binding bars being positioned on opposite sides of one of the two of them in each pair, binders connecting together the binding bars of each pair in the middle between any two of said first mentioned pairs of bars, said binders holding said binding bars in pressing engagement with said first mentioned bars, binders connecting together the bars of each of said first mentioned pairs of bars in the middle between any two of the pairs of binding bars, and binders connecting together the first mentioned bars with the binding bars at their crossing points.

5. The combination with a wall of parallel bars placed in the wall in one direction, parallel binding bars placed in the wall in pairs at right angles to said first mentioned bars and on both sides of same, and binders connecting the binding bars of each pair together in the middle between any two of said first mentioned bars, said binders holding said binding bars in pressing engagement with said first mentioned bars.

6. The combination with a wall of parallel bars placed in the wall in one direction, parallel binding bars placed in the wall in pairs at right angles to said first mentioned bars and on both sides of same, binders connecting the binding bars of each pair together in the middle between any two of said first mentioned bars, said binders holding said binding bars in pressing engagement with said first mentioned bars, and binders connecting the binding bars at the crossing points with said first mentioned bars.

7. The combination with a wall of parallel bars placed in the wall in pairs in one direction, parallel binding bars placed in pairs at right angles to said first mentioned bars, said binding bars being positioned on opposite sides of one of the two of them in each pair, binders connecting together the binding bars of each pair in the middle between any two of the pairs of said first mentioned bars, said binders holding said binding bars in pressing engagement with said first mentioned bars, and binders connecting together the first mentioned bars of each pair in the middle between any two of the pairs of binding bars.

8. The combination with a wall of parallel bars placed in the wall in pairs in one direction, parallel binding bars placed in the wall in pairs at right angles to said first mentioned bars, said binding bars being positioned on opposite sides of one of the two of them in each pair, binders connecting together the binding bars of each pair in the middle between any two of the said first mentioned pairs of bars, said binders holding said binding bars in pressing engagement with said first mentioned bars, and binders connecting together said first mentioned bars of each pair in the middle between any two of the pairs of binding bars, and binders connecting together said first mentioned bars with the binding bars at their crossing points.

9. A metallic lathing to be embedded in a wall, comprising parallel bars placed in one direction, parallel binding bars placed in pairs at an angle to said first mentioned bars and at both sides of the same, said binding bars being bent toward one another at points intermediate said first mentioned bars, and binders connecting said binding bars at said intermediate points and holding said bars in pressing engagement with said first mentioned bars.

In witness whereof I have hereunto set my hand in presence of two witnesses.

PAUL STOLTE.

Witnesses:
HAUS ANNIM,
WOLDEMAR HAUPT.

Copies of this patent may be obtained for five cents each, by addressing the "Commissioner of Patents, Washington, D. C."